US010158478B2

(12) United States Patent
Gueron et al.

(10) Patent No.: US 10,158,478 B2
(45) Date of Patent: Dec. 18, 2018

(54) FLEXIBLE ARCHITECTURE AND INSTRUCTION FOR ADVANCED ENCRYPTION STANDARD (AES)

(71) Applicant: Intel Corporation, Santa Clara, CA (US)

(72) Inventors: Shay Gueron, Haifa (IL); Wajdi K Feghali, Boston, MA (US); Vinodh Gopal, Westborough, MA (US); Raghunandan Makaram, Northborough, MA (US); Martin G Dixon, Portland, OR (US); Srinivas Chennupaty, Portland, OR (US); Michael E Kounavis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/984,673

(22) Filed: Dec. 30, 2015

(65) Prior Publication Data
US 2016/0119130 A1 Apr. 28, 2016

Related U.S. Application Data

(63) Continuation of application No. 14/572,620, filed on Dec. 16, 2014, now Pat. No. 9,634,830, which is a
(Continued)

(51) Int. Cl.
G06F 21/72 (2013.01)
H04L 9/28 (2006.01)
(Continued)

(52) U.S. Cl.
CPC .......... *H04L 9/0631* (2013.01); *G06F 3/0623* (2013.01); *G06F 3/0665* (2013.01);
(Continued)

(58) Field of Classification Search
CPC ......... H04L 9/28; H04L 9/122; H04L 9/0681; H04L 2209/12; H04L 2209/122; H04L 2209/125; G06F 21/72; G06F 21/602
(Continued)

(56) References Cited

U.S. PATENT DOCUMENTS 4,641,238 A 2/1987 Kneib
5,781,758 A * 7/1998 Morley ............... G06F 9/45504
703/23
(Continued)

FOREIGN PATENT DOCUMENTS

CN 1655496 A 8/2005
CN 1677921 A 10/2005
(Continued)

OTHER PUBLICATIONS

American National Standard Institute, "The Elliptic Curve Digital Signature Algorithm (ECDSA)", American National Standard for Financial Services, Accredited Standards Committee X9, Inc. Financial Services, X9.62/2005—Draft, Nov. 14, 2005, 163 pages.
(Continued)

*Primary Examiner* — Joseph P Hirl
*Assistant Examiner* — Kalish K Bell
(74) *Attorney, Agent, or Firm* — NDWE, LLP

(57) ABSTRACT

A flexible aes instruction set for a general purpose processor is provided. The instruction set includes instructions to perform a "one round" pass for aes encryption or decryption and also includes instructions to perform key generation. An immediate may be used to indicate round number and key size for key generation for 128/192/256 bit keys. The flexible aes instruction set enables full use of pipelining capabilities because it does not require tracking of implicit registers.

25 Claims, 8 Drawing Sheets

Related U.S. Application Data continuation of application No. 14/014,091, filed on Aug. 29, 2013, which is a continuation of application No. 11/729,199, filed on Mar. 28, 2007, now Pat. No. 8,538,015.

(51) Int. Cl.

| | | |
|---|---|---|
| *H04L 9/06* | (2006.01) | |
| *H04L 9/08* | (2006.01) | |
| *G06F 12/14* | (2006.01) | |
| *G06F 21/60* | (2013.01) | |
| *G06F 12/0875* | (2016.01) | |
| *G06F 9/30* | (2018.01) | |
| *G06F 12/0862* | (2016.01) | |
| *G06F 9/38* | (2018.01) | |
| *G11C 7/10* | (2006.01) | |
| *G06F 3/06* | (2006.01) | |

(52) U.S. Cl.
CPC ........ *G06F 3/0689* (2013.01); *G06F 9/30007* (2013.01); *G06F 9/30036* (2013.01); *G06F 9/30047* (2013.01); *G06F 9/30145* (2013.01); *G06F 9/30178* (2013.01); *G06F 9/3802* (2013.01); *G06F 9/3818* (2013.01); *G06F 9/3887* (2013.01); *G06F 9/3895* (2013.01); *G06F 12/0862* (2013.01); *G06F 12/0875* (2013.01); *G06F 12/1408* (2013.01); *G06F 21/602* (2013.01); *G11C 7/1072* (2013.01); *H04L 9/0816* (2013.01); *H04L 9/0861* (2013.01); *G06F 2212/1052* (2013.01); *G06F 2212/402* (2013.01); *G06F 2212/452* (2013.01); *G06F 2212/454* (2013.01); *G06F 2212/602* (2013.01); *H04L 2209/12* (2013.01); *H04L 2209/24* (2013.01)

(58) Field of Classification Search
USPC .................... 380/28; 708/200, 490, 495, 507
See application file for complete search history.

(56) References Cited

U.S. PATENT DOCUMENTS

| | | | |
|---|---|---|---|
| 6,118,870 A | 9/2000 | Boyle et al. | |
| 6,324,288 B1 | 11/2001 | Hoffman | |
| 6,704,871 B1 | 3/2004 | Kaplan et al. | |
| 6,937,727 B2 | 8/2005 | Yup et al. | |
| 7,203,310 B2 | 4/2007 | England et al. | |
| 7,277,540 B1 | 10/2007 | Shiba et al. | |
| 7,346,159 B2 | 3/2008 | Gura et al. | |
| 7,496,196 B2 | 2/2009 | Jalfon et al. | |
| 7,509,501 B2 | 3/2009 | Park et al. | |
| 7,532,726 B2 | 5/2009 | Fukuoka et al. | |
| 7,539,876 B2 | 5/2009 | Henry et al. | |
| 7,570,760 B1 * | 8/2009 | Olson ................... | H04L 9/0637 380/28 |
| 7,949,130 B2 | 5/2011 | Gueron et al. | |
| 8,538,015 B2 | 9/2013 | Gueron et al. | |
| 2002/0108059 A1 | 8/2002 | Canion et al. | |
| 2003/0108195 A1 | 6/2003 | Okada et al. | |
| 2003/0226052 A1 | 12/2003 | Hill et al. | |
| 2004/0049293 A1 | 3/2004 | Hadwiger et al. | |
| 2004/0148512 A1 | 7/2004 | Park et al. | |
| 2004/0184602 A1 | 9/2004 | Nadehara | |
| 2004/0184607 A1 | 9/2004 | Chang et al. | |
| 2004/0202317 A1 * | 10/2004 | Demjanenko ........ | H04L 9/0631 380/28 |
| 2004/0208072 A1 | 10/2004 | Henry et al. | |
| 2004/0208314 A1 | 10/2004 | Patariu et al. | |
| 2004/0255130 A1 | 12/2004 | Glenn et al. | |
| 2005/0147239 A1 | 7/2005 | Chin et al. | |
| 2005/0169463 A1 | 8/2005 | Ahn et al. | |
| 2005/0213756 A1 | 9/2005 | Hubert | |
| 2005/0286720 A1 | 12/2005 | Fukuoka et al. | |
| 2007/0014395 A1 | 1/2007 | Joshi et al. | |
| 2007/0083735 A1 * | 4/2007 | Glew .................... | G06F 9/3012 712/214 |
| 2007/0189522 A1 | 8/2007 | Raju et al. | |
| 2008/0040540 A1 * | 2/2008 | Cavallo ................ | G06F 3/0613 711/114 |
| 2008/0159526 A1 | 7/2008 | Gueron et al. | |
| 2008/0229116 A1 | 9/2008 | Dixon et al. | |
| 2008/0240426 A1 | 10/2008 | Gueron et al. | |
| 2009/0003593 A1 | 1/2009 | Gopal et al. | |
| 2010/0153686 A1 * | 6/2010 | Frank .................... | G06F 9/3851 712/34 |

FOREIGN PATENT DOCUMENTS

| | | | |
|---|---|---|---|
| CN | 1761185 | A | 4/2006 |
| CN | 1898896 | A | 1/2007 |
| EP | 1 496 421 | A2 | 1/2005 |
| EP | 1 519 509 | A2 | 3/2005 |
| EP | 1 586 971 | A2 | 10/2005 |
| EP | 1 596 530 | A1 | 11/2005 |
| EP | 1586971 | A3 | 9/2006 |
| GB | 2447563 | A | 9/2008 |
| KR | 10-2002-0061718 | A | 7/2002 |
| KR | 10-2005-0078271 | A | 8/2005 |
| TW | I268449 | B | 12/2006 |
| TW | I268686 | B | 12/2006 |
| TW | I269169 | B | 12/2006 |
| WO | 03/019357 | A1 | 3/2003 |
| WO | 2004/002057 | A2 | 12/2003 |
| WO | 2005/006197 | A2 | 1/2005 |
| WO | 2005/006197 | A3 | 2/2006 |
| WO | 2008/121614 | A1 | 10/2008 |

OTHER PUBLICATIONS

Astarloa, et al., "Multi-architectural 128 bit AES-CBC Core based an Open-Source Hardware AES Implementations for Secure Industrial Communications", International Conference on Communication Technology, ICCT '06, 2006, 5 pages.

Atsushi Oshima, "Close up a core micro architecture", IT Media, Feb. 1, 2007, 18 pages.

Bertoni, et al., "Speeding Up AES Extending a 32bit Processor Instruction Set", International Conference on Application—specific Systems, Architectures and Processors, 2006, 6 pages.

Brown et al., "Software Implementation of the NIST Elliptic Curves Over Prime Fields", Topics in Cryptology: The Cryptographer's Track at RSA, lecture Notes in Computer Science (LNCS), vol. 2020, 2001, pp. 250-265.

CERTICOM, "SEC 1: Elliptic Curve Cryptography", Standards for Efficient Cryptography, Version 1.0, Sep. 20, 2000, 97 pages.

Daemen, et al., "AES Proposal: Rijndael," AES Proposal, Sep. 3, 1999, pp. 1-45.

Fischer, et al., "Two methods of Rijndael Implementation in Reconfigurable Hardware", Cryptographic Hardware and Embedded Systems—CHES 2001, Springer Berlin/Heidelberg, 2001, 16 pages.

Gonzalez, R, "XTENSA: A Configurable and extensible processor", IEEE Micro, vol. 20, Issue 2, Mar.-Apr. 2000, pp. 60-70.

Hunt, "Secure Processors: for Secure Devices and Secure End-to-End Infrastructure", IBM Corporation, 2006, 14 pages.

Koc, et al., "Low-complexity bit-parallel canonical and normal basis multipliers for a class of finite fields", IEEE Transactions on Computers, vol. 47, Issue 3, Mar. 1998, pp. 353-356.

Menezes, et al., "Efficient Implementation", Handbook of Applied Cryptography, Chapter 14, 1997, pp. 591-634.

Nadehara, et al., "Extended instructions for the AES cryptography and their efficient implementation", IEEE Workshop on Signal Processing Systems, 2004 (SIPS 2004), pp. 152-157.

International Preliminary Report on Patentability and Written Opinion received for PCT Patent Application No. PCT/US2008/058128, dated Sep. 29, 2009, 5 pages.

(56) References Cited

OTHER PUBLICATIONS

International Search Report and Written Opinion received for PCT Patent Application No. PCT/US2008/058128, dated Jul. 31, 2008, 10 pages.
TENSILICA, Inc., "Implementing the Advanced Encryption Standard on Xtensa Processors", searched on Dec. 15, 2011, Nov. 2005, 77 pages.
Tillich, et aL, "An Instruction Set Extension for Fast and Memory-Efficient AES Implementation", International Federation for Information Processing 2005, Communications and Multimedia Security, CMS, Lecture Notes in Computer Science (LNCS), vol. 3677, 2005, pp. 11-21.
Tomonari, H., "Examining a 'Nay to realize AES Encryption Circuit", Design Wave Magazine, CQ Publishing Co., Ltd., Dec. 1, 2003, pp. 154-160.
VIA Technologies, "VIA Padlock Programming Guide", Version 1.60, May 3, 2005, pp. 1-55.
Office Action received for United Kingdom Patent Application No. 0804870.4, dated Apr. 8, 2009, 2 pages.
Office Action received for United Kingdom Patent Application No. 0804870.4, dated Jun. 25, 2008, 7 pages.
Extended European Search report received for the European Patent Application No. 08744319.8, dated Feb. 16, 2011, 9 pages.
Office Action received for the European Patent Application No. 08744319.8, dated Feb. 24, 2015, 7 pages.
Office Action received for Korean Patent Application No. 10-2008-24067, dated Feb. 18, 2010, 3 pages of English Translation and 5 pages of Korean Office Action.
Office Action received for German Patent Application No. 10 2008 014 359.6-31, dated Jul. 21, 2010, 2 pages of English Translation only.
Office Action received for German Patent Application No. 10 2008 014 359.6-31, dated May 15, 2009, 6 pages of English translation only.
Final Office Action received for U.S. Appl. No. 11/729,199, dated Oct. 26, 2010, 17 Pages.
Non-Final Office Action received for U.S. Appl. No. 11/729,199, dated Apr. 13, 2010, 18 Pages.
Non-Final Office Action received for U.S. Appl. No. 11/729,199, dated Mar. 30, 2012, 21 Pages.
Non-Final Office Action received for U.S. Appl. No. 11/729,199, dated Nov. 9, 2012, 21 Pages.
Notice of Allowance received for U.S. Appl. No. 11/729,199, dated May 28, 2013, 17 Pages.
Final Office Action received for U.S. Appl. No. 14/014,091, dated Jun. 26, 2015, 10 Pages.
Non-Final Office Action received for U.S. Appl. No. 14/014,091, dated Dec. 3, 2014, 10 pages.
Non-Final Office Action received for U.S. Appl. No. 14/572,423, dated Nov. 24, 2015, 14 pages.
Non-Final Office Action received for U.S. Appl. No. 14/572,540, dated Nov. 6, 2015, 17 pages.
Non-Final Office Action received for U.S. Appl. No. 14/572,545, dated Nov. 19, 2015, 18 pages.
Non-Final Office Action received for U.S. Appl. No. 14/572,565, dated Nov. 10, 2015, 15 pages.
Non-Final Office Action received for U.S. Appl. No. 14/572,578, dated Nov. 9, 2015, 16 pages.
Non-Final Office Action received for U.S. Appl. No. 14/572,584, dated Dec. 3, 2015, 16 pages.
Non-Final Office Action received for U.S. Appl. No. 14/572,602, dated Dec. 3, 2015, 15 pages.
Non-Final Office Action received for U.S. Appl. No. 14/572,607, dated Nov. 6, 2015, 15 pages.
Non Final Office Action received for U.S. Appl. No. 14/572,620, dated Sep. 15, 2015, 11 pages.
Extended European Search Report received on European Patent Application No. 14169143.6, dated Feb. 23, 2015, 8 pages.
Office Action Received for Chinese Patent Application No. 200810096342.2, dated Apr. 1, 2010, 4 pages of English Translation only.
Office Action received for Chinese Patent Application No. 200880006495.1, dated Apr. 25, 2011, 8 Pages of Office Action and 8 Pages of English Translation.
Office Action received for Chinese Patent Application No. 200880006495.1, dated Nov. 22, 2011, 11 Pages of Office Action and 11 Pages of English Translation.
Notice of Allowance received for Chinese Patent Application No. 200880006495.1, dated Jan. 15, 2013, 2 Pages of Notice and 2 Pages of English Translation.
Office Action received for Chinese Patent Application No. 200880006495.1, dated Jun. 19, 2012, 4 Pages of Office Action including 1 page of English Translation.
Office Action received for Japanese Patent Application No. 2009-552935, dated Apr. 16, 2013, 8 pages of Office Action including 4 pages of English Translation.
Office Action received for Japanese patent Application No. 2009-552935, dated Jan. 10, 2012, 3 pages of Office Action including 4 pages of English Translation.
Office Action received for Japanese patent Application No. 2009-552935, dated Jun. 12, 2012, 8 pages of office Action including 4 pages of English Translation.
Office Action received for Japanese Patent Application No. 2012-226077, dated Jun. 25, 2013, 4 pages of Office Action and 3 pages of English Translation.
Office Action received for Japanese Patent Application No. 2012-226077, dated Mar. 12, 2013, 7 pages of Office Action including 3 pages of English Translation.
Office Action received for Japanese Patent Application No. 2013-222466, dated Aug. 26, 2014, 4 pages of Office Action and 4 Pages of English Translation.
Office Action received for Chinese Patent Application No. 201310110523.7, dated Apr. 8, 2015, 9 pages of Chinese Office Action only.
Office Action received for Taiwan Patent Application No. 97111091, dated Jan. 2, 2012, 10 pages.
Office Action received for Japanese Patent Application No. 2015-012125, dated Dec. 15, 2015, 3 pages of English Translation and 3 pages of Japanese Office Action.
Office Action received for Chinese Patent Application No. 201310110523.7, dated Jan. 14, 2016, 7 pages of English Translation and 5 pages of Chinese Office Action.
Office Action received for Japanese Patent Application No. 2015-049638, dated Dec. 15, 2015, 4 pages of English Translation and 5 pages of Japanese Office Action.
Notice of Allowance received for the U.S. Appl. No. 14/572,540, dated Dec. 19, 2016, 8 Pages.
Notice of Allowance received for the U.S. Appl. No. 14/572,565, dated Dec. 15, 2016, 9 Pages.
Notice of Allowance received for the U.S. Appl. No. 14/572,578, dated Dec. 23, 2016, 8 Pages.
Notice of Allowance received for U.S. Appl. No. 14/572,584, dated Dec. 21, 2016, 14 Pages.
Notice of Allowance received for U.S. Appl. No. 14/572,593, dated Dec. 9, 2016, 7 pages.
Notice of Allowance received for the U.S. Appl. No. 14/572,620, dated Dec. 15, 2016, 10 Pages.
Notice of Allowance received for U.S. Appl. No. 14/572,423, dated Dec. 30, 2016, 13 Pages.
Notice of Allowance received for U.S. Appl. No. 14/572,602, dated Jan. 5, 2017, 11 Pages.
Final Office Action received for U.S. Appl. No. 14/014,091, dated Dec. 30, 2016, 32 Pages.
Office Action received for Chinese Patent Application No. 201310110523.7, dated Sep. 13, 2016, 8 Pages of Chinese Office Action including 4 Pageso of English Translation.
Non Final Office Action Received for the U.S. Appl. No. 14/572,545, dated Nov. 28, 2016, 15 Pages.
Non Final Office Action Received for the U.S. Appl. No. 14/572,607, dated Nov. 23, 2016, 13 Pages.

(56) References Cited

OTHER PUBLICATIONS

Non Final Office Action received for U.S. Appl. No. 14/014,091, dated Apr. 14, 2016, 42 Pages.
Final Office Action received for U.S. Appl. No. 14/572,423, dated May 19, 2016, 16 pages.
Final Office Action Received for the U.S. Appl. No. 14/572,540, dated May 6, 2016, 11 Pages.
Final Office Action Received for the U.S. Appl. No. 14/572,545, dated May 4, 2016, 17 Pages.
Final Office Action Received for the U.S. Appl. No. 14/572,565, dated May 5, 2016, 14 Pages.
Final Office Action Received for the U.S. Appl. No. 14/572,578, dated May 13, 2016, 14 Pages.
Final Office Action received for U.S. Appl. No. 14/572,584, dated May 31, 2016, 18 pages.
Final Office Action received for U.S. Appl. No. 14/572,602, dated Jun. 2, 2016, 13 pages.
Final Office Action Received for the U.S. Appl. No. 14/572,607, dated May 5, 2016, 13 pages.
Final Office Action Received for the U.S. Appl. No. 14/572,620, dated May 16, 2016, 14 pages.
Non Final Office Action received for U.S. Appl. No. 14/572,593, dated Apr. 28, 2016, 15 pages.
Non Final Office Action received for U.S. Appl. No. 14/872,584, dated Jun. 27, 2016, 8 pages.
Non Final Office Action received for U.S. Appl. No. 14/984,588, dated Jun. 27, 2016, 8 pages.
Non Final Office Action received for U.S. Appl. No. 14/984,601, dated Jun. 27, 2016, 8 pages.
Non Final Office Action received for U.S. Appl. No. 14/872,556, dated Jun. 30, 2016, 8 pages.
Non Final Office Action received for U.S. Appl. No. 14/984,616, dated Jul. 5, 2016, 9 pages.
Non Final Office Action received for U.S. Appl. No. 14/984,637, dated Jul. 5, 2016, 9 pages.
Non Final Office Action received for U.S. Appl. No. 14/984,647, dated Jul. 5, 2016, 9 pages.
Non Final Office Action received for U.S. Appl. No. 14/984,629, dated Jul. 6, 2016, 9 pages.
Non Final Office Action received for U.S. Appl. No. 14/984,656, dated Jul. 19, 2016, 12 pages.
Non Final Office Action received for U.S. Appl. No. 14/984,663, dated Jul. 29, 2016, 13 pages.
Non Final Office Action received for U.S. Appl. No. 14/984,686, dated Jul. 29, 2016, 13 pages.
Non-Final Office Action received for U.S. Appl. No. 14/014,091, dated Aug. 2, 2017, 28 pages.
Final Office Action received for U.S. Appl. No. 14/572,545, dated May 11, 2017, 13 pages.
Final Office Action received for U.S. Appl. No. 14/572,607, dated Aug. 30, 2017, 13 pages.
Office Action received for Chinese Patent Application No. 201310110523.7, dated May 17, 2017, 10 pages of Chinese Office Action including 5 pages of English Translation.
Final Office Action received for U.S. Appl. No. 14/984,588, dated Feb. 10, 2017, 14 pages.
Final Office Action received for U.S. Appl. No. 14/984,601, dated Feb. 9, 2017, 15 pages.
Final Office Action received for U.S. Appl. No. 14/984,616, dated Feb. 10, 2017, 14 pages.
Final Office Action received for U.S. Appl. No. 14/984,629, dated Feb. 9, 2017, 15 pages.
Final Office Action received for U.S. Appl. No. 14/984,637, dated Feb. 9, 2017, 15 pages.
Final Office Action received for U.S. Appl. No. 14/984,647, dated Feb. 10, 2017, 15 pages.
Final Office Action received for U.S. Appl. No. 14/872,556, dated Feb. 8, 2017, 15 pages.
Final Office Action received for U.S. Appl. No. 14/872,584, dated Feb. 8, 2017, 15 pages.
Final Office Action received for U.S. Appl. No. 14/984,656, dated Mar. 6, 2017, 15 pages.
Final Office Action received for U.S. Appl. No. 14/984,663, dated Mar. 6, 2017, 15 pages.
Final Office Action received for U.S. Appl. No. 14/984,686, dated Mar. 6, 2017, 15 pages.
Extended European Search Report received for European Patent Application No. 16191616.8, dated Feb. 8, 2017, 9 pages.
Non-Final Office Action received for U.S. Appl. No. 14/872,556, dated Sep. 13, 2017, 16 pages.
Non-Final Office Action received for U.S. Appl. No. 14/872,584, dated Sep. 14, 2017, 17 pages.
Non-Final Office Action received for U.S. Appl. No. 14/984,588, dated Sep. 25, 2017, 15 pages.
Non-Final Office Action received for U.S. Appl. No. 14/984,616, dated Sep. 22, 2017, 16 pages.
Non-Final Office Action received for U.S. Appl. No. 14/984,637, dated Sep. 22, 2017, 16 pages.
Non-Final Office Action received for U.S. Appl. No. 14/984,656, dated Oct. 12, 2017, 24 pages.
Non-Final Office Action received for U.S. Appl. No. 14/984,663, dated Oct. 13, 2017, 25 pages.
Non-Final Office Action received for U.S. Appl. No. 14/984,686, dated Oct. 24, 2017, 24 pages.
Notice of Allowance received for Chinese Patent Application No. 201310110523.7, dated Aug. 18, 2017, 4 pages of Chinese Notice of Allowance including 2 pages of English Translation.
Office Action received for Japanese Patent Application No. 2015-012125, dated Sep. 6, 2016, 7 pages of Japanese Office Action including 3 pages of English Translation.
Office Action received for Japanese Patent Application No. 2015-049638, dated Sep. 6, 2016, 7 pages of Japanese Office Action including 3 pages of English Translation.
NIST, "(Specification for the) Advanced Encryption Standard (AES)", Federal Information Processing Standards Publication 197, Nov. 26, 2001, 51 pages.

* cited by examiner

830

832
dest:=aes_key_round(source2, source1), key_select_modifier

| PORTS 833 | | | | | | INTEGER FLAGS 834 | | | | | | FLOATING-POINT FLAGS 836 | | | | |
|---|---|---|---|---|---|---|---|---|---|---|---|---|---|---|---|---|
| 0 | 1 | 2 | 3 | 4 | 5 | O | S | Z | A | P | C | Pre C | C3 | C2 | C1 | C0 |
| - | - | - | - | x | - | - | - | - | - | - | - | - | - | - | - | - |

| EXECUTION UNIT 210 | AES UNIT |
|---|---|
| INTEGER EVENTS | — |
| PRE-OPERATION EVENTS | NA |
| POST-OPERATION EVENTS | NA |

FIG. 8

FLEXIBLE ARCHITECTURE AND INSTRUCTION FOR ADVANCED ENCRYPTION STANDARD (AES)

CLAIM OF PRIORITY

This application claims the priority filing benefit of, is a continuation of, and incorporates by reference, U.S. patent application Ser. No. 14/572,620 entitled "FLEXIBLE ARCHITECTURE AND INSTRUCTION FOR ADVANCED ENCRYPTION STANDARD (AES)" filed on Dec. 16, 2014, which is a continuation application of U.S. patent application Ser. No. 14/014,091, entitled "FLEXIBLE ARCHITECTURE AND INSTRUCTION FOR ADVANCED ENCRYPTION STANDARD (AES)" filed Aug. 29, 2013 which is a continuation of U.S. patent application Ser. No. 11/729,199, entitled "FLEXIBLE ARCHITECTURE AND INSTRUCTION FOR ADVANCED ENCRYPTION STANDARD (AES)" filed Mar. 28, 2007 and now patented as U.S. Pat. No. 8,538,015 issued on Sep. 17, 2013.

FIELD

This disclosure relates to cryptographic algorithms and in particular to the advanced encryption standard (AES) algorithm.

BACKGROUND

Cryptology is a tool that relies on an algorithm and a key to protect information. The algorithm is a complex mathematical algorithm and the key is a string of bits. There are two basic types of cryptology systems: secret key systems and public key systems. A secret key system also referred to as a symmetric system has a single key ("secret key") that is shared by two or more parties. The single key is used to both encrypt and decrypt information.

The Advanced Encryption Standard (AES), published by the National Institute of Standards and Technology (NIST) as Federal Information Processing Standard (FIPS) 197 is a secret key system. AES is a symmetric block cipher that can encrypt and decrypt information.

Encryption (cipher) performs a series of transformations using the secret key (cipher key) to transforms intelligible data referred to as "plaintext" into an unintelligible form referred to as "cipher text". The transformations in the cipher include: (1) Adding a round key (value derived from the cipher key) to the state (a two dimensional array of bytes) using a Exclusive OR (XOR) operation; (2) Processing the state using a non-linear byte substitution table (S-Box) (3) Cyclically shifting the last three rows of the state by different offsets; and (4) Taking all of the columns of the state and mixing their data (independently of one another) to produce new columns.

Decryption (inverse cipher) performs a series of transformations using the cipher key to transform the "cipher text" blocks into "plaintext" blocks of the same size. The transformations in the inverse cipher are the inverse of the transformations in the cipher.

The Rijindael algorithm is specified in the AES standard to process data blocks of 128 bits, using cipher keys with lengths of 128, 192 and 256 bits. The different key lengths are typically referred to as AES-128, AES-192 and AES-256.

The AES algorithm transforms the plaintext into cipher text or cipher text into plaintext in 10, 12, or 14 consecutive rounds, with the number of rounds dependent on the length of the key.

BRIEF DESCRIPTION OF THE DRAWINGS

Features of embodiments of the claimed subject matter will become apparent as the following detailed description proceeds, and upon reference to the drawings, in which like numerals depict like parts, and in which:

FIG. 8 illustrates an embodiment of an aes round instruction with immediate byte that may be used to generate round keys and perform encryption and decryption.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

The Advanced Encryption Standard (AES) algorithm is a compute intensive algorithm that is typically performed in software or in a special purpose processor. Thus, encryption is typically only used for encrypting a subset of the information stored in computers, for example, information that may be classified as "top secret". However, there is a need to encrypt more of the information that is stored on computers. For example, if all information stored on a mobile computer was encrypted, this information would be protected in the event that the mobile computer was stolen.

AES is a block cipher that operates on a 128-bit block of bits with a key size of 128, 192 or 256 bits. A sequence of operations is iterated for a number of rounds (10, 12 or 14) based on the key size.

The generation of the keys for each round may be performed on the fly (that is, just prior to each round) using implicit 128-bit registers to store the round key. However, the use of implicit registers may reduce the performance of x86 register-based processors due to dependency on a result of a previous instruction.

There are some applications, for example, an application that processes network packets that may have different keys per flow that benefit from on-the-fly key generation. There may be other applications where greater performance is required with the single key, for example, a single key that is used for encrypting/decrypting contents of a disk drive. Thus, there arises a need for flexibility of key generation. An embodiment of the invention provides a flexible architecture and instruction for performing AES encryption and decryption in a general purpose processor.

Figure 1:
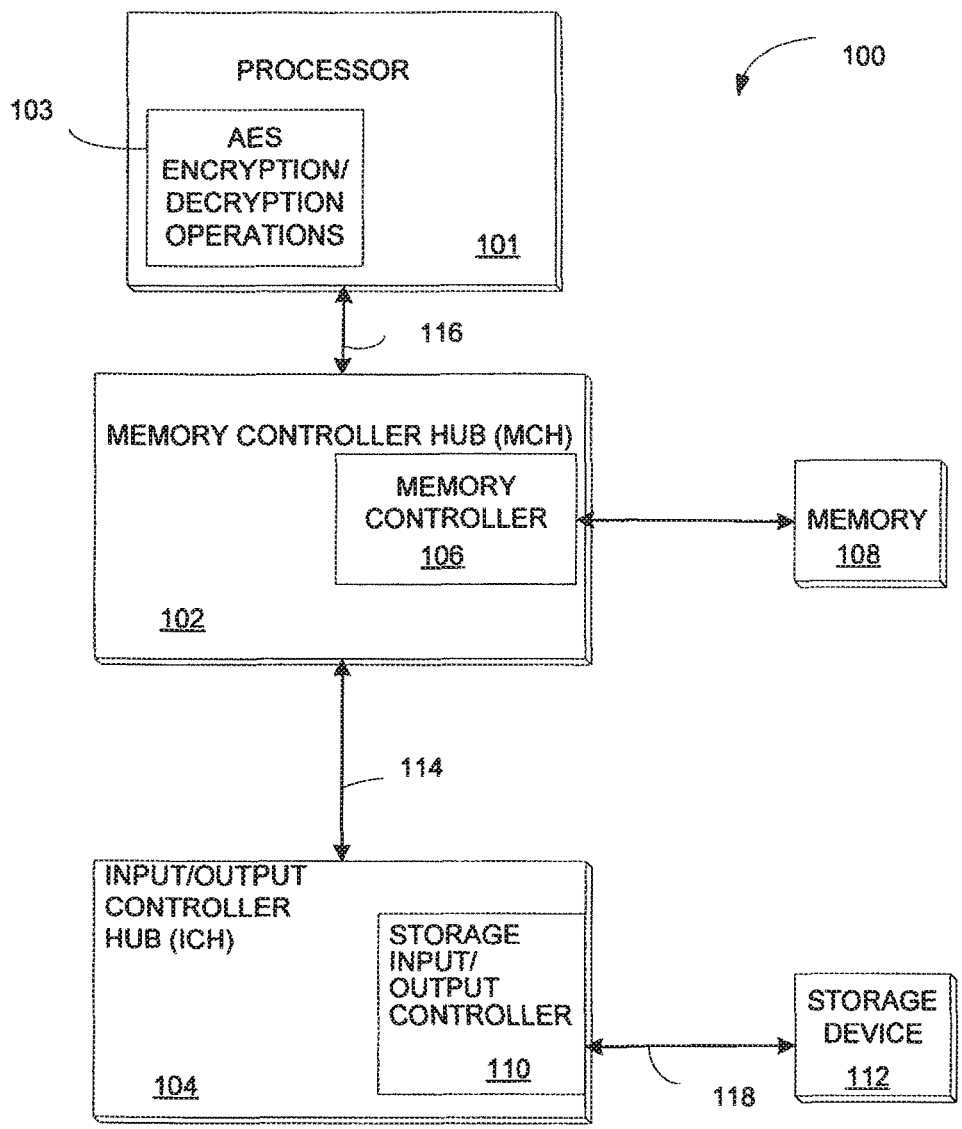
FIG. 1 is a block diagram of a system that includes an embodiment of a flexible architecture and instruction for performing AES encryption and decryption in a general purpose processor according to the principles of the present invention.

FIG. 1 is a block diagram of a system 100 that includes an embodiment of a flexible architecture and instruction for performing AES encryption and decryption in a general purpose processor according to the principles of the present invention. The system 100 includes a processor 101, a Memory Controller Hub (MCH) or (Graphics Memory Controller Hub (GMCH)) 102 and an Input/Output (I/O) Controller Hub (ICH) 104. The MCH 102 includes a memory controller 106 that controls communication between the processor 101 and memory 108. The processor 101 and MCH 102 communicate over a system bus 116.

The processor 101 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 108 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller 110 for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

The processor 101 includes an AES function 103 to perform aes encryption and decryption operations. The AES function 103 may be used to encrypt or decrypt information stored in memory 108 and/or stored in the storage device 112.

Figure 2:
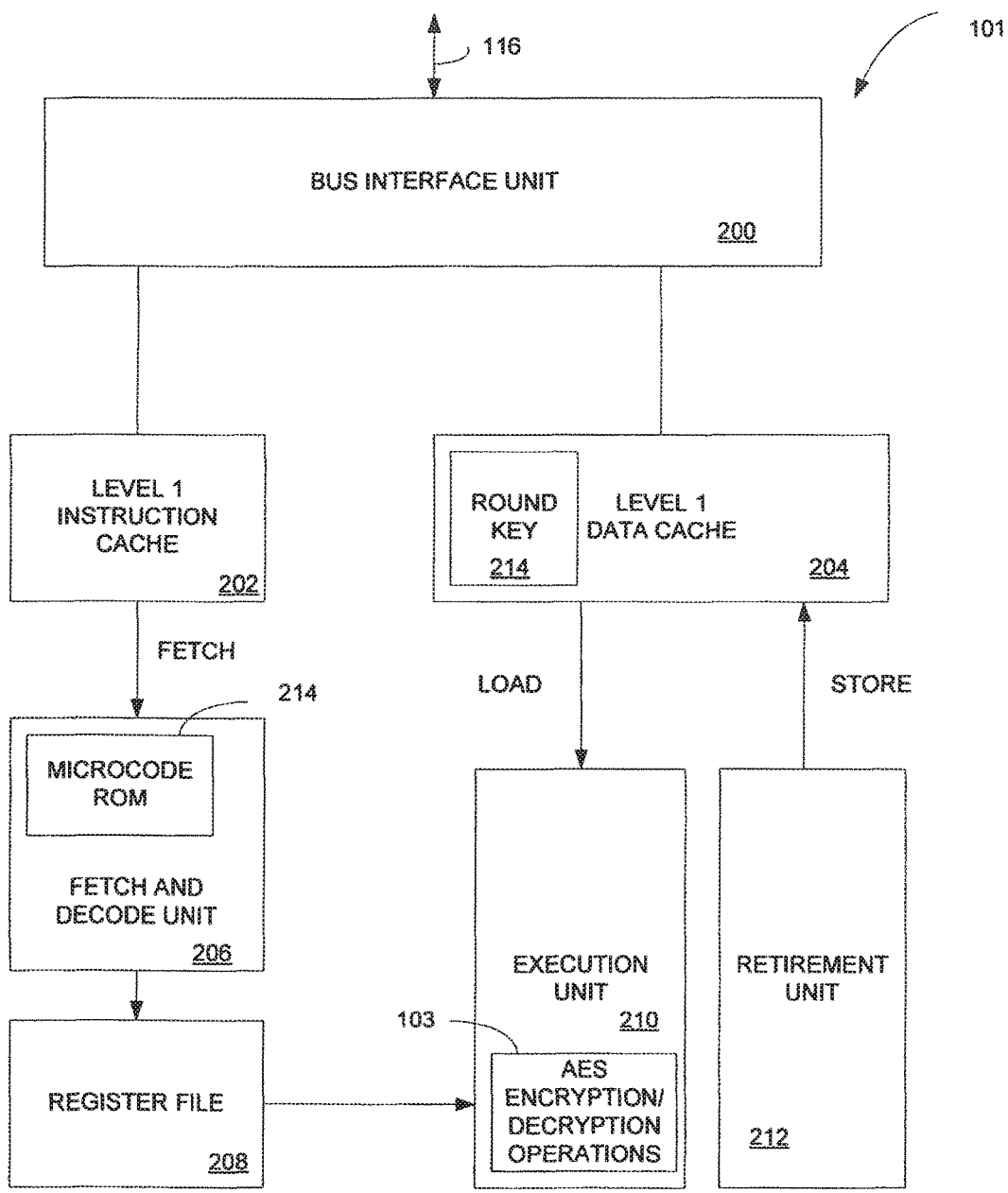
FIG. 2 is a block diagram of an embodiment of the processor shown in FIG. 1.

FIG. 2 is a block diagram of an embodiment of the processor 101 shown in FIG. 1. Processor 101 includes a fetch and decode unit 206 for decoding processor instructions received from Level 1 (L1) instruction cache 202. Data to be used for executing the instruction may be stored in register file 208. In one embodiment, the register file 208 includes a plurality of 128-bit registers, which are used by an aes instruction to store data for use by the aes instruction.

In one embodiment, the register file is a group of 128-bit registers similar to the 128-bit MMX registers provided in Intel Pentium MMX Processors that have a Streaming (Single Instruction Multiple Data (SIMD)) Extension (SSE) Instruction set. In a SIMD processor, data is processed in 128-bit blocks with one 128-bit block loaded at one time.

The fetch and decode unit 202 fetches macroinstructions from L1 instruction cache 202, decodes the macroinstructions and breaks them into simple operations called micro operations (μops) that may be stored in microcode Read Only Memory (ROM) 214. The execution unit 210 schedules and executes the micro operations. In the embodiment shown, the aes function 103 in the execution unit 210 includes micro operations for an aes instruction set. The retirement unit 212 writes the results of the executed instructions to registers or memory. A round key 214 used by the aes instruction may be stored in L1 data cache 204 and loaded into the execution unit 210 for use by the micro operations to execute an aes instruction in the aes instruction set. Storing the round key 214 in the data cache 204 protects the round key from side channel attacks, for example, attempts to obtain the round key in order to get access to encrypted information stored in the system 100.

Figure 3:
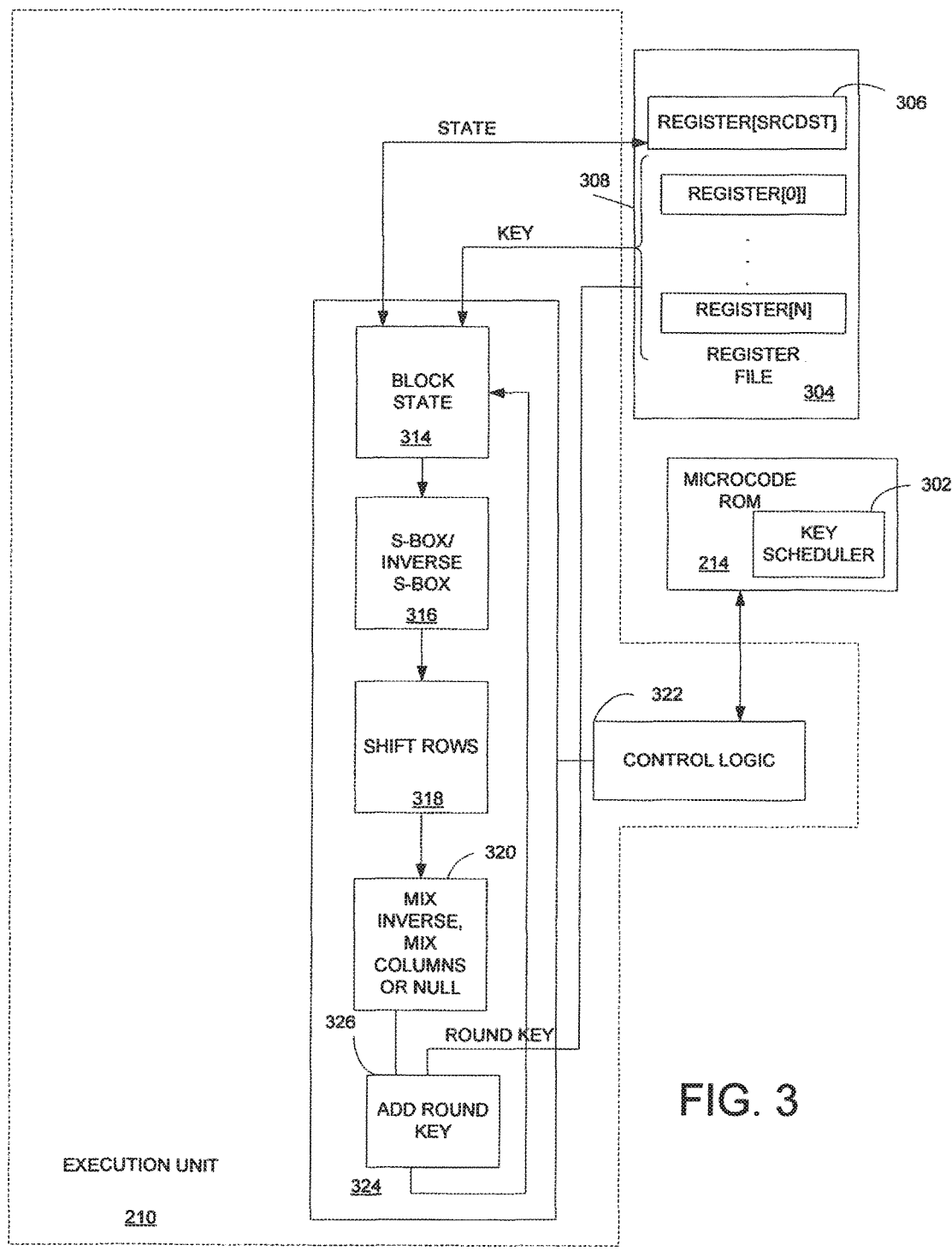
FIG. 3 is a block diagram that includes an embodiment of the execution unit shown in FIG. 2 for performing AES encryption and decryption according to the principles of the present invention.

FIG. 3 is a block diagram that illustrates an embodiment of the execution unit 210 shown in FIG. 2 for performing AES encryption and decryption according to the principles of the present invention. FIG. 3 will be described in conjunction with FIG. 2.

After an aes instruction has been decoded by the fetch and decode unit 206, the execution of an aes instruction by the execution unit 210 involves performing the micro operations associated with the aes instruction that may be stored in the microcode ROM 214.

A flexible AES instruction set according to an embodiment of the present invention allows a programmer to make performance tradeoffs with respect to the amount of data to be processed, and memory bandwidth and capacity.

Some applications may continuously use the same key. In applications in which performance is very important, a tradeoff can be made in terms of pre-computing a key schedule for the key (that is, a round key per round) once and storing it in memory. Other applications may want to minimize the amount of memory used to store the key schedule while still achieving good performance on multi-block operations. For such applications the key schedule may be pre-computed for multiple blocks before being processed. The memory footprint may be further minimized by only storing the cipher key or the inverse cipher key, and then deriving the other as necessary at the expense of some performance.

In an x86-type processor, the area and the number of execution ports that are available for AES round key operations and AES scheduling operations constrain the performance of an AES instruction. In a system in which key expansion is required for every block encryption, performance may be improved by placing the AES scheduling operations and the AES round key operations on separate execution ports. However, separate execution ports and the additional area for controlling the separate ports may not be available in an x86-type processor.

In an embodiment, an aes instruction set is provided that includes separate aes instructions for performing an encryption round, a decryption round, an encryption last round, a decryption last round and for computing an encryption round key or a decryption round key. In one embodiment there are six aes instructions in the aes instruction set. Each aes round instruction has a unique operation code (opcode). The aes round instructions in the aes instruction set for one embodiment for a fixed width round key (for example, 128-bits) are shown below in Table 1.

TABLE 1

```
AESENCRYPTRound xmmsrcdst xmm
    Input:   data (=destination), round key
    Output:  data after transformation through the AES round
             using the round key
AESENCRYPTLastRound xmmsrcdst xmm
    Input:   data (=destination), round key
    Output:  data after transformation through the AES last
             round using the round key
AESDECRYPTRound xmmsrcdst xmm
    Input:   data (=destination), round key
    Output:  data after transformation through the AES round
             using the round key
AESDECRYPTLastRound xmmsrcdst xmm
    Input:   data (=destination), round key
    Output:  data after transformation through the AES last
             round using the round key
AESNextRoundKey xmmsrc1,2 xmm dst (immediate)
    Input:   low 128 bits of key, high 128 bits of key, indicator
             for round number.
    Output:  next round key derived from the input
AESPreviousRoundKey xmmsrc1,2 xmm dst (immediate)
    Input:   low 128 bits of key, high 128 bits of key, indicator
             for round number
    Output:  previous round key derived from the input
```

The aes instruction set includes four aes round instructions (encrypt, decrypt, encrypt last round, decrypt last round) and two aes round key instructions (next round key and previous round key). The aes round instructions in the aes instruction set include single round operations to perform encryption and decryption round operations that are to be used for all rounds but the last round. For example, in the AESENCRYPTRound single round instruction in Table 1, the input data is stored in a 128-bit register (xmmsrcdst) and the round key stored in another 128-bit register (xmm). This instruction performs an aes round operation on input data (source) that is stored in the 128-bit xmmsrcdst register and overwrites the input data stored in the 128-bit xmmsrcdst register with the result of the execution of the round operation. Thus xmmsrcdst first stores the input data and later stores the result of the aes round operation.

The aes instruction set also includes an aes decryption instruction for a last decryption round and an aes encryption instruction for a last encryption round. For example, in the 'AESENCRYPTLastRound single round instruction in Table 1, the input data is stored in a 128-bit register (xmmsrcdst) and the round key stored in another 128-bit register (xmm). This instruction performs an aes round operation on input data (source) that is stored in the xmmsrcdst register and overwrites the input data stored in the xmmsrcdst register with the result of the execution of the round operation. Thus xmmsrcdst first stores the input data and later stores the result of the round operation. The xmm register stores the round key for the round operation.

In another embodiment, the round and last round instructions, for example, 'AESENCRYPTRound and AESENCRYPTLastRound may take the input from memory (m/128) instead of from the register file 304, for example, the aes round instruction may be AESENCRYPTRound xmmsrcdst m/128.

The other two aes instructions in the aes instruction set generate a round key for an aes round dependent on the size of the key, that is, 128-bits, 192-bits or 256-bits. One of the aes round key instructions generates a round key for use in an encryption operation and the other aes round key instruction generates a round key for use in a decryption operation. The immediate field in the AESNextRoundKey and the AESPreviousRoundKey instructions specify the size of the key {128, 192, 256}.

In yet another embodiment, instead of an immediate field, the different key sizes may be implemented as separate instructions each having a unique operation code. In this embodiment, the number of aes round key instructions includes three separate instructions for each round key operation, for example, AESNextRoundKey_128 AESNextRoundKey_192 and AESNextRoundKey_256 and there would be a similar set of three instructions for AESPreviousRoundKey. In this embodiment, the total number of instructions in the instruction set is 10 instead of 6 in the previously discussed embodiment.

The register file 304 has a plurality of 128-bit registers which may be used by the aes instructions in the aes instruction set. The 128-bit registers may store source operand(s), round keys and the result of the aes instruction. For the first round, the aes instruction receives a source operand that may be 128-bit of plaintext to be encrypted or 128-bits of cipher text to be decrypted. A key for generating a key schedule for a 128-bit, 192-bit or 256-bit key may be stored in any of the 128-bit registers 308 in the register file 304. The round keys may also be stored in any of the 128-bit registers 308 in the register file. All of the instructions use registers in the register file and may also take input directly from memory as discussed earlier.

An example of source code that uses an embodiment of the aes instruction set shown in Table 1 is shown in Table 2 below. In the example, performance is optimized in an application for performing encryption that uses the same key for many blocks. One such application is the use of a single key for encrypting contents of a disk in which the same key is used for encrypting all of the data prior to being stored on the disk. In the example, AES-128 encryption is performed.

The size of the key may be 128-bits, 192-bits or 256-bits. The number of rounds to be performed (n) may be 1, 10, 12 or 14 dependent on the size of the key with each round key being a fixed size (128-bits). With a number of rounds value of 10, 12, 14, the aes micro operations may perform standard aes encryption and decryption for key sizes of 128-bits, 192-bits or 256-bits.

When the same key is used for many blocks, the round key for each round (key schedule) may be pre-computed and stored in memory (for example, level 1 data cache 204) so that the same key schedule does not have to be recomputed prior to an encryption/decryption operation on each block.

TABLE 2

```
RK[0] = Input Key
For i = 1..10
    RK [i] = AESNextRoundKey (RK[i−1])
End
STATE = Input Block
STATE = STATE xor RK[0]
For i = 1..9
    STATE = AESENCRYPTRound (STATE, RK[i])
End
STATE = AESENCRYPTLastRound (STATE, RK[10])
```

An array (RK) having 10 elements is used to store the key schedule for the key. The input key for AES-128 encryption is stored in RK[0] and the 9 round keys RK[0]-RK[1] are pre-computed through a call to the AESNextRoundKey instruction from the aes instruction set. The AESNextRoundKey instruction computes the next round based on the current round key. The pre-computed round keys for the key schedule may be stored in round key 214 in level 1 data cache 204.

In this example, as the portion of the key schedule (expanded key), that is the round key for the round is input directly from the register file 304, an exclusive OR (XOR) operation is performed on the state and key prior to entering the loop for performing the aes rounds. For each round 1 through 9, the AESENCRYPTRound instruction from the aes instruction set is called to perform the aes round operation for one round. For the last round (round 10) the AESNECYRPTLastRound instruction from the aes instruction set is called to perform the aes round operation for the last round.

Information to be encrypted or decrypted by the aes instruction is loaded into a source/destination register 306 in the register file 304 prior to issuing the first aes instruction to start an encrypt or decrypt operation. The key to be used to encrypt/decrypt the information in the source register 306 is stored in one or more other registers 308 in the register file 308. In the case of a 128-bit key, the entire 128-bits of the key are stored in any one of the other 128-bit registers in the register file 304. For key sizes greater than 128 bits, the most significant bits (greater than 128 bits) are stored in another one of the 128-bit registers.

In the example shown in Table 2, the round key for each round is pre-computed based on the key and may be stored in level 1 data cache 204 prior to being loaded into any one of the registers 308 in the register file 304. The key for each round may also be stored in one or more registers in the register file 304 or may be stored in round key 214 in level 1 data cache 204.

AES has a fixed block size of 128 bits and a key size of 128, 192 or 256 bits and operates on a 4×4 array of bytes (that is, 16 bytes (128-bit fixed block size)), which is referred to as the 'state'. The AES algorithm transforms a 128-bit plaintext block into a 128-bit block of cipher text (encrypts) or a 128-bit block of cipher text into a 128-bit block of plaintext (decrypts) in 10, 12, or 14 consecutive rounds, with the number of rounds dependent on the key size (128, 192 or 256-bits).

Prior to performing the per round encryption or decryption operation, the execution unit 210 retrieves the state and the key which are stored in the register file 304. Each encryption/decryption round operation is performed using the micro operations for the aes instruction stored in the key scheduler 302 in the Read Only Memory (ROM) 214. In the embodiment shown, the state (128-bit block state) is stored in register 306 and the key is stored in one or more of the other registers 308 in the register file 304. After the execution of the aes instruction is complete, the resulting state is stored in register 306 in the register file 304. The state may be an intermediate round date to be used by a next aes round or the final result of the AES encryption or decryption operation.

In the embodiment shown, a key scheduler 302 generates the round key to be used in an aes round. The key scheduler 302 may be implemented as microcode operations and may include microcode operations to perform the sequence of operations for generating round keys for 128-bit, 196-bit and 256-bit keys as defined by FIPS Publication 197.

In another embodiment, the key scheduler may be implemented as a hardware state machine sequence in the execution unit 210. In yet another embodiment, some portion of the key scheduler may be implemented as microcode operations stored in the microcode ROM 214 and the remainder of the key scheduler may be implemented as a hardware state machine sequence in the execution unit 210.

The key scheduler 302 expands the n-bytes of a key into b-bytes of an expanded key (key schedule) with the first n-bytes of the expanded key being the original key. For example, for a 128-bit key, the 128-bit key is expanded into a 176-bytes expanded key, that is, 11×16-bytes (128-bits), with the first 16-bytes being the original 128-bit key, and thus the number of rounds is 10. The 24 bytes of a 192-bit key are expanded into 208 bytes (13×16 bytes) to provide 12 "round keys" one for each of the 12 rounds and the 32 bytes of a 256-bit key are expanded into 240 bytes (15×16 bytes) to provide 14 "round keys" one for each of the 14 rounds.

Upon decoding the operation code (opcode) in an aes instruction, a number of parameters to be used to control the flow in the aes instruction for one aes round are stored in control logic 322. The parameters include the type of operation (encryption or decryption) and whether it is a last round.

Aes round logic 324 may include micro operations for the following stages: block state 314, s-box/inverse S-box 316, shift rows 316 and mix inverse, mix columns or null (referred to as "mix columns") 320 and add round key 326.

In block state 314, the 128-bit input (state) to the aes round logic 324 is added with a key (128-bit portion of the expanded key associated with the round) using bitwise XOR to produce a 128-bit intermediate value (state).

In the S-box/inverse S-box 316, each byte of this 128-bit intermediate value is substituted with another byte value that may be stored and retrieved from a lookup table also referred to as a substitution box or "S-Box". The S-box takes some number of input bits, m, and transforms them into some number of output bits, n and is typically implemented as a lookup table. A fixed lookup table is typically used. This operation provides non-linearity through the use of the inverse function over Galois Field $(GF)(2^8)$. For example, the n-bit output may be found by selecting a row in the lookup table using the outer two bits of the m-bit input, and selecting a column using the inner bits of the m-bit input.

In Shift Rows 318, the results from S-box/inverse S-box 316 passes through a bit-linear transform in which bytes in each row of the 4×4 array (128-bit (16 bytes) state) received from the Sub Bytes stage are shifted cyclically to the left. The number of places each byte is shifted differs for each row in the 4×4 array.

In Mix Columns 320, the results from Shift Rows 320 passes through a bit-linear transform in which each column of the 4×4 array (state) is treated as a polynomial over a binary Galois Field $(GF)(2^8)$ and is then multiplied modulo $x^4+1$ with a fixed polynomial $c(x)=3x^3+x^2+x+2$. A last aes round differs from the other aes rounds in that it omits Mix Columns 320.

Add Round Key 324 after the Mix Columns stage 320 performs an exclusive OR function on the round key from the expanded key and the result of Shift Rows 318 or Mix Columns 320 for the aes round.

For example, the following aes instruction may be issued to perform one round of aes decryption:

AESDECRYPTRound xmmsrcdst xmm

This example performs a 128-bit AES encrypt round operation with a key whose expanded key is represented as {RK[1], RK[2], RK[10]}. The round key may be generated by issuing a AESPreviousRoundKey xmmsrc1, 2 xmm dst (immediate) instruction prior to issuing the AESDECRYPTRound instruction. The round key may be loaded directly into the block state 314 from Level 1 data cache 204 or may first be stored in a register (xmm) in the register file 304 and then loaded into the block state 314 from the register.

When a different key is used to encrypt/decrypt each block, for example, in the case of a network interface controller (NIC) that is encrypting/decrypting data packets, the round key may computed on-the-fly prior to performing encryption/decryption for each round as shown in the pseudo code below in Table 3 for AES-128 encryption:

TABLE 3

RK[0] = Input Key
STATE = Input Block
STATE = STATE xor RK[0]
For i = 1..9
    RK [i] = AESNextRoundKey (RK[i−1])
    STATE = AESENCRYPTRound (STATE, RK[i])
End
RK [10] = AESNextRoundKey (RK[9])
STATE = AESENCRYPTLastRound (STATE, RK[10])

In this example, the round key for the round is generated prior to performing encryption using the round key for each of the 10 rounds in the key schedule (expanded key), that is, rounds 1-9 and round 10 (the last round).

The set of aes instructions that include single aes round instructions and single aes round key generation instructions allows variants of AES with different number of rounds and key schedules, that is, variants of AES not defined by FIPS Publication 197. Thus, the single round aes instructions in the aes instruction set provide flexibility in performing aes encryption and decryption.

As the number of rounds performed by the aes instruction set is not fixed, any numbers of rounds, if required, may be performed. For example, the number of rounds may be varied to support future encryption/decryption standards if new standards for hashing or MAC-ing attacks, or attacks on AES are introduced.

Figure 4:
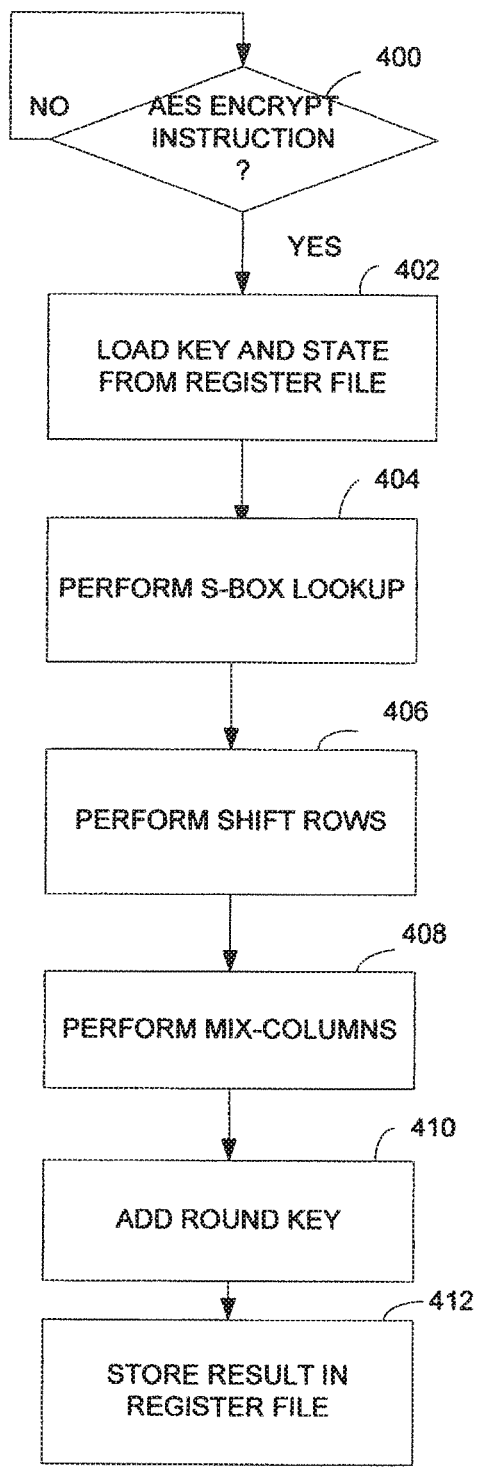
FIG. 4 is a flow graph illustrating the flow of an aes encrypt round instruction through the execution unit shown in FIG. 3.

FIG. 4 is a flow graph illustrating the flow of an aes encrypt round instruction through the execution unit 210 shown in FIG. 3.

At block 400, the execution unit 210 waits for an aes encrypt round instruction. If an AES encrypt round instruction has been decoded by the fetch and decode unit 206, processing continues with block 402. If not, processing remains in block 400 waiting for an aes encrypt round instruction.

At block 402, during the instruction decode by the fetch and decode unit 206, an indication that encryption is to be performed is stored in the control logic 322 and the round key and 128-bit block state (source) for use in performing the encryption round are loaded into the execution unit 210 from the register file 304. Processing continues with block 404.

At block 404, a substitution operation is performed on the 128-bit block state that is, the result from block 406 or 418. Each byte of the 128-bit block state is substituted with another byte value that can be stored and retrieved from a lookup table also referred to as a substitution box or "S-Box". The S-box takes some number of input bits, m, and transforms them into some number of output bits, n and is typically implemented as a lookup table. The result is stored as a 128-bit block state. Processing continues with block 406.

At block 406, the 128-bit block state (4×4 array) passes through a bit-linear transform in which bytes in each row of the 4×4 array are shifted cyclically to the left. The number of places each byte is shifted differs for each row in the 4×4 array. Processing continues with block 408.

At block 408, the 128-bit block state (4×4 array) passes through a bit-linear transform in which each column of the 4×4 array (state) is treated as a polynomial over $GF(2^8)$ and is then multiplied modulo $x^4+1$ with a fixed polynomial $c(x)=3x^3+x^2+x+2$. Processing continues with block 410.

At block 410, an exclusive OR function is performed on the round key from the expanded key and the result of Shift Rows 318 or Mix Columns 320 for the aes round. Processing continues with block 412.

At block 412, the result of the encryption operation for the round (128-bit block state) is stored in the source/destination register 302 in the register file 304. Processing for the aes encrypt instruction is complete.

Table 4 below shows an example of the result of performing AES-128 encryption using a 128-bit key on a 128-bit block input after execution of the pseudo code shown in Table 3.

TABLE 4

| | |
|---|---|
| 128-bit Input: | 00112233445566778899aabbccddeeff (Hexadecimal) |
| 128-bit Key: | 000102030405060708090a0b0c0d0e0f (Hexadecimal) |
| 128-bit Result: | 69c4e0d86a7b0430d8cdb78070b4c55a (Hexadecimal) |

Figure 5:
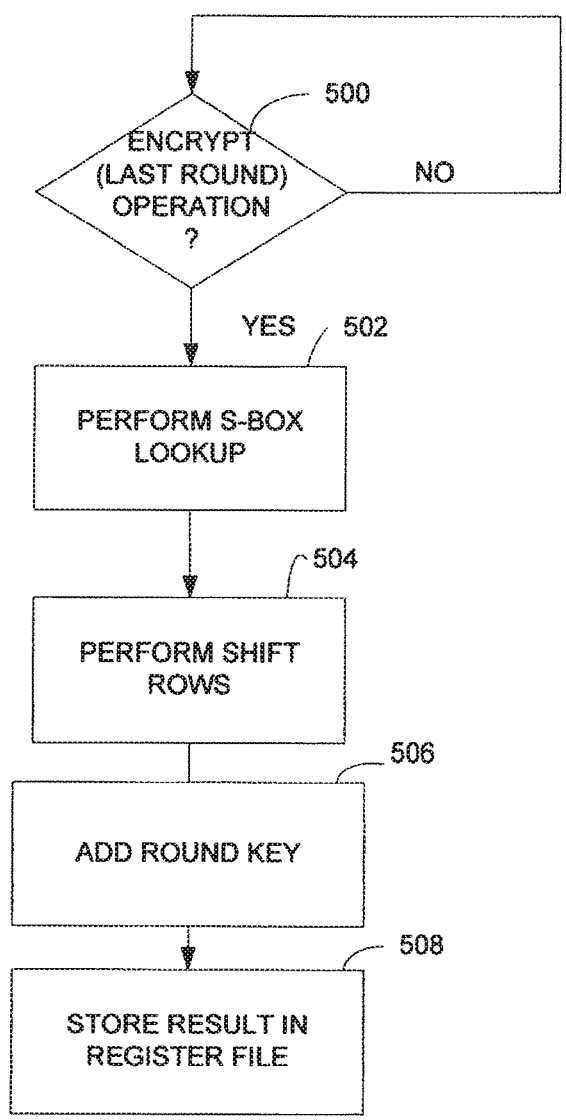
FIG. 5 is a flow graph illustrating the flow of an aes encrypt last round instruction through the execution unit shown in FIG. 3.

FIG. 5 is a flow graph illustrating the flow of an aes encrypt last round instruction through the execution unit 210 shown in FIG. 3.

At block 500, the execution waits for an aes encrypt last round instruction. If an AES encrypt last round instruction has been decoded by the fetch and decode unit 206, processing continues with block 502. If not, processing remains in block 500 waiting for an aes instruction.

At block 502, an S-box lookup is performed for the last round in a similar manner to the S-box lookup discussed in conjunction with block 404 (FIG. 4). Processing continues with block 504.

At block 504, a shift rows operation is performed for the last round in a similar manner to that discussed in conjunction with the other rounds in block 406 (FIG. 4). Processing continues with block 506.

At block 506, an exclusive OR function is performed on the round key from the expanded key and the result of Shift Rows 318 or Mix Columns 320 for the aes round. Processing continues with block 508.

At block 508, the result of the encryption last round operation is stored in the source/destination register 306 in the register file 304. Processing for the aes instruction is complete.

Figure 6:
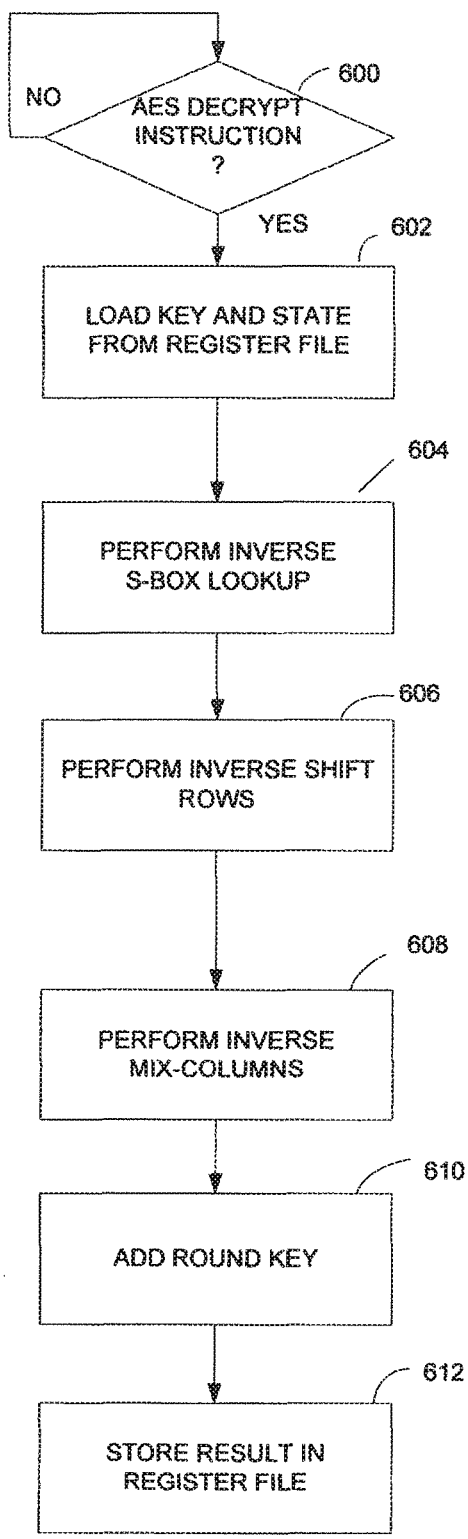
FIG. 6 is a flow graph illustrating the flow of an aes decrypt round instruction through the execution unit shown in FIG. 3.

FIG. 6 is a flow graph illustrating the flow of an aes decrypt round instruction through the execution unit 210 shown in FIG. 3.

At block 600, the execution waits for an aes decrypt round instruction. If an AES decrypt round instruction has been decoded by the fetch and decode unit 206, processing continues with block 602. If not, processing remains in block 600 waiting for an aes decrypt round instruction.

At block 602, during the instruction decode by the fetch and decode unit 206, an indication that a decrypt round is to be performed is stored in the control logic 322 and the round key and source (128-bit block state) for use in performing the decrypt round are loaded into the execution unit 210 from the register file 304. Processing continues with block 604.

At block 604, the operation to be performed is decryption. A substitution operation is performed on the 128-bit block state by performing an inverse s-box lookup as defined by the AES standard. Processing continues with block 606.

At block 606, an inverse shift rows operation is performed as defined by FIPS publication 197. Processing continues with block 608.

At block 608, an inverse shift rows operation is performed as defined by FIPS publication 197. Processing continues with block 610.

At block 610, an exclusive OR function is performed on the round key from the expanded key and the result of Shift Rows 318 or Mix Columns 320 for the aes round. Processing continues with block 612.

At block 612, the result of the decryption operation for the round (128-bit block state) is stored in the source/destination register 302 in the register file 304. Processing for the aes decrypt round instruction is complete.

Figure 7:
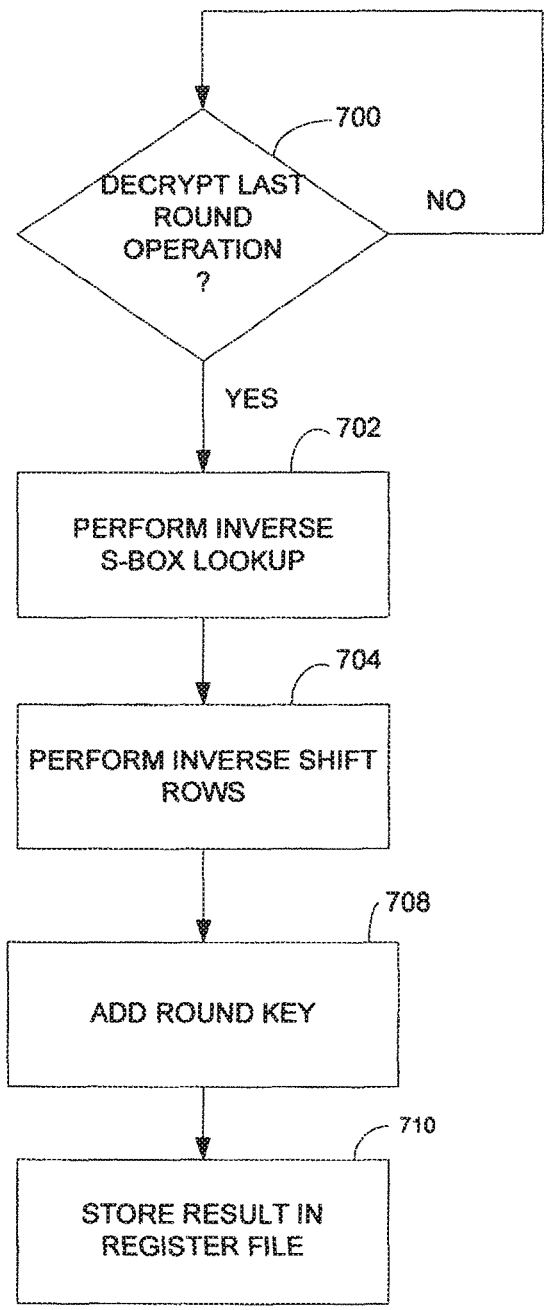
FIG. 7 is a flow graph illustrating the flow of an aes decrypt last round instruction through the execution unit shown in FIG. 3.

FIG. 7 is a flow graph illustrating the flow of an aes decrypt last round instruction through the execution unit 210 shown in FIG. 3.

At block 700, the execution unit 210 waits for an aes decrypt last round instruction. If an AES decrypt last round instruction has been decoded by the fetch and decode unit 206, processing continues with block 702. If not, processing remains in block 700 waiting for an aes decrypt last round instruction.

At block 702, a substitution operation is performed on the 128-bit block state for the last round by performing an inverse s-box lookup as defined by FIPS publication 197. Processing continues with block 704.

At block 704, an inverse shift rows operation is performed for the last round as defined by FIPS publication 197. Processing continues with block 706.

At block 706, an exclusive OR function is performed on the round key from the expanded key and the result of Shift Rows 318 or Mix Columns 320 for the aes round. Processing continues with block 708.

At block 708, the result of the decrypt last round operation is stored in the source/destination register 306 in the register file 304. Processing for the aes decrypt last round instruction is complete.

In one embodiment, the blocks in the flowgraphs of FIGS. 4-7 may be implemented as a hardware state machine sequence in the execution unit 210. In another embodiment portions of the blocks may be implemented as a microprogram that may be stored in Read Only Memory (ROM) 214. The embodiment in which the blocks are implemented as a hardware state machine sequence may provide higher performance.

FIG. 8 illustrates an embodiment of an aes round instruction 830 with immediate byte that may be used to generate round keys and perform encryption and decryption. Instead of the aes instruction set shown in Table 1, a single aes round instruction is provided to perform the functions of the aes instruction set. The particular function to be performed by the single aes instruction is encoded in bits in the immediate byte (key_select_modifier) 832. The immediate byte allows the aes round instruction to be expanded to add new features instead of creating a plurality of new instructions with each instruction having a unique operation code.

The aes round instruction 830 may be defined symbolically as follows:

dest:=aes_key_round (source2, source1), key_select_modifier.

The aes_key_round instruction is issued to a particular execution unit 210 based on port number 833 in order to perform an AES encrypt or decrypt operation. In the embodiment shown, port number 4 is the designated execution port for the AES round instruction. The execution unit 210 is divided into many parallel ports (super-scalar). However, not all ports are equal. Some ports have specialized resources such as a large integer multiplier, or floating-point multiplier or divider. Simpler and more common instructions such as addition, subtraction and exclusive OR are supported on multiple ports for maximum performance. Thus for each instruction or micro-operation, issue control logic determines the port to which to issue the micro-operation/instruction. In this embodiment, the aes instruction is always issued to port number 4. However, in other embodiments other port numbers may be used.

Referring to FIG. 8, the dest stores 128 bits of expanded key for round N, source2 stores 128 bits of expanded key for round N−1, and source1 stores 128 bits of expanded key for round N−2. The key_select_modifier 832 is an 8-bit immediate value used to provide current round number (N), direction of operation (encrypt/decrypt) and AES key size. For AES-128, source1 is not needed and is ignored. The execution unit 210 is AES unit and no flags (integer 834 or floating point 836) are used.

In one embodiment, the bit encoding of the four least significant bits of the immediate value indicate the round number, for example, a round number from 1-10 for AES-128, a round number from 1-12 for AES-192 and a round number from 2-14 for AES 256. For AES-128 and 192 round number 0 is not valid because the first round uses the unmodified input key. For AES-256 round numbers 0 and 1 are not valid as the unmodified 256-bit input key is used for the first 2 128-bit rounds.

Bit 4 of the immediate byte indicates the direction of operation (encryption or decryption), for example, in one embodiment 0=encrypt, and 1=decrypt and in another embodiment 1=encrypt, and 0=decrypt. Bits 5 and 6 of the immediate byte indicate the AES key size. In one embodiment the AES key size is defined as shown in Table 5 below:

TABLE 5

| Bits [6:5] | Key Size |
| --- | --- |
| 00 | 128 |
| 01 | 192 |
| 10 | 256 |
| 11 | Reserved |

In another embodiment, bits [6:5] having a value of 11 is also an indicator for a 128-bit key size. In this embodiment, all values of bits [6:5] are valid and may be parsed.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. A system comprising:
 a processor comprising:
  a plurality of cores;
  a level 1 (L1) instruction cache to store a plurality of instructions, the plurality of instructions to include a plurality of Advanced Encryption Standard (AES) instructions of an instruction set of the processor that includes a Single Instruction Multiple Data (SIMD)

instruction set, wherein the plurality of AES instructions include more than four but less than ten AES instructions including a first AES instruction for a final round of an AES decryption operation, a second AES instruction for a round of the AES decryption operation, a third AES instruction for a round of an AES encryption operation, and a fourth AES instruction for a final round of the AES encryption operation, and wherein the plurality of AES instructions each comprise a different opcode;

an L1 data cache;

instruction fetch logic to fetch instructions from the L1 instruction cache;

decode logic to decode instructions including the first AES instruction;

a microcode memory to store microcode;

a first 128-bit source register to store a round key to be used for the final round of the AES decryption operation;

a second 128-bit source register to store input data to be decrypted by the final round of the AES decryption operation;

a plurality of ports each associated with one or more corresponding execution resources to support parallel execution of integer and floating point operations; and an execution unit including AES execution logic to execute the first AES instruction of the instruction set of the processor to perform the final round of the AES decryption operation using microcode determined from the decode of the first AES instruction and obtained from the microcode memory, the final round of the AES decryption operation to use the round key from the first 128-bit source register to decrypt the input data from the second 128-bit source register, and to store a final decrypted result of the AES decryption operation in a 128-bit destination register, wherein the final round of the AES decryption operation is to include:

a substitution operation to be performed on the input data, the substitution operation to use an inverse substitution box (S-box) lookup;

an inverse Shift Rows operation; and an Add Round Key operation in which an exclusive OR function is to use data from the round key;

a memory controller to couple the processor to a dynamic random access memory (DRAM); and an input/output (I/O) controller to couple the processor to one or more devices, wherein the one or more devices are to include one or more storage devices, and wherein the one or more storage devices are to be arranged as a Redundant Array of Independent Disks (RAID).

2. The system of claim 1, wherein the memory controller is a graphics memory controller.

3. The system of claim 1, wherein the I/O controller is a storage I/O controller.

4. The system of claim 1, the one of more devices to include at least one disk drive.

5. The system of claim 1, the one or more devices to include at least one Digital Video Disk (DVD) drive.

6. The system of claim 1, the one or more devices to include at least one network interface.

7. The system of claim 6, wherein the at least one network interface is to be coupled to the processor to process data packets.

8. The system of claim 1, the one or more devices to include at least one network interface controller (NIC).

9. The system of claim 8, wherein the NIC is to be coupled to the processor to process data packets.

10. The system of claim 1, the one or more devices to include at least none network interface, and wherein at least one of the one or more storage devices is to be coupled to the processor over at least one Serial Attached Small Computer System Interface (SAS).

11. The system of claim 1, the one or more devices to include at least none network interface, and wherein the one or more storage devices are to be arranged as a Redundant Array of Independent Disks (RAID).

12. The system of claim 1, wherein the DRAM is Synchronized Dynamic Random Access Memory (SDRAM).

13. The system of claim 1, wherein the DRAM is Double Data Rate (DDR) Random Access Memory.

14. The system of claim 1, wherein the DRAM is Double Data Rate 2 (DDR2) Random Access Memory.

15. The system of claim 1, wherein the DRAM is Rambus Dynamic Random Access Memory (RDRAM).

16. The system of claim 1, wherein the DRAM is Double Data Rate (DDR) Random Access Memory.

17. A system comprising:

a processor comprising:

a level 1 (L1) instruction cache to store a plurality of instructions, the plurality of instructions to include a plurality of Advanced Encryption Standard (AES) instructions of an instruction set of the processor that includes a Single Instruction Multiple Data (SIMD) instruction set, wherein the plurality of AES instructions include more than four but less than ten AES instructions including a first AES instruction for a final round of an AES decryption operation, a second AES instruction for a round of the AES decryption operation, a third AES instruction for a round of an AES encryption operation, and a fourth AES instruction for a final round of the AES encryption operation, and wherein the plurality of AES instructions each comprise a different opcode;

an L1 data cache;

a decode unit to decode instructions including the first AES instruction;

a microcode memory to store microcode;

a first 128-bit source register to store a round key to be used for the final round of the AES decryption operation;

a second 128-bit source register to store input data to be decrypted by the final round of the AES decryption operation;

a plurality of ports each associated with one or more corresponding execution resources to support parallel execution of integer and floating point operations;

an execution unit to perform the first AES instruction of the instruction set of the processor to perform the final round of the AES decryption operation using microcode determined from the decode of the first AES instruction and obtained from the microcode memory, the final round of the AES decryption operation to use the round key from the first 128-bit source register to decrypt the input data from the second 128-bit source register, and to store a final decrypted result of the AES decryption operation in a 128-bit destination register, wherein the final round of the AES decryption operation is to include:

a substitution operation to be performed on the input data, the substitution operation to use an inverse substitution box (S-box) lookup;

an inverse Shift Rows operation; and an Add Round Key operation in which an exclusive OR function is to use data from the round key; and a retirement unit;

a memory controller to couple the processor to a dynamic random access memory (DRAM); and an input/output (I/O) controller to couple the processor to one or more devices.

18. The system of claim 17, wherein the memory controller is a graphics memory controller, and wherein the execution unit is to have a different execution port to perform the first AES instruction than one or more other execution ports that are to be used for AES key scheduling operations.

19. The system of claim 17, wherein the I/O controller is a storage I/O controller.

20. The system of claim 17, the one of more devices to include at least one disk drive.

21. The system of claim 17, the one or more devices to include at least one Digital Video Disk (DVD) drive, and wherein the execution unit is to have a different execution port to perform the first AES instruction than one or more other execution ports that are to be used for AES key scheduling operations.

22. The system of claim 17, the one or more devices to include at least one network interface.

23. A system comprising:

a general purpose processor comprising:

a level 1 (L1) instruction cache to store a plurality of instructions, the plurality of instructions to include an Advanced Encryption Standard (AES) instruction of an instruction set of the general purpose processor that includes a Single Instruction Multiple Data (SIMD) instruction set, wherein the AES instruction has a bit with a value of zero to indicate that decryption is to be performed instead of a value of one which would indicate that encryption is to be performed;

an L1 data cache;

a decode unit to decode instructions including the AES instruction;

a microcode memory to store microcode;

a first 128-bit source register to store a round key to be used for a final round of an AES decryption operation;

a second 128-bit source register to store input data to be decrypted by the final round of the AES decryption operation;

a plurality of ports each associated with one or more corresponding execution resources to support parallel execution of integer and floating point operations;

an execution unit to perform the AES instruction of the instruction set of the general purpose processor to perform the final round of the AES decryption operation using microcode determined from the decode of the AES instruction and obtained from the microcode memory, the final round of the AES decryption operation to use the round key from the first 128-bit source register to decrypt the input data from the second 128-bit source register, and to store a final decrypted result of the AES decryption operation in a 128-bit destination register, wherein the final round of the AES decryption operation is to include:

a substitution operation to be performed on the input data, the substitution operation to use an inverse substitution box (S-box) lookup;

an inverse Shift Rows operation; and an Add Round Key operation in which an exclusive OR function is to use data from the round key;

a retirement unit;

a memory controller to couple the general purpose processor to a dynamic random access memory (DRAM); and an input/output (I/O) controller to couple the general purpose processor to one or more devices, the one or more devices to include one or more storage devices, wherein at least one of the one or more storage devices is to be coupled to the processor over at least one Serial Attached Small Computer System Interface (SAS).

24. The system of claim 1, wherein the processor further comprises a retirement unit, and wherein the execution unit is to have a different execution port to perform the first AES instruction than one or more other execution ports that are to be used for AES key scheduling operations.

25. The system of claim 23, wherein the execution unit is to have a different execution port to perform the first AES instruction than one or more other execution ports that are to be used for AES key scheduling operations.

* * * * *